United States Patent

Malinowski et al.

[11] Patent Number: 5,574,572
[45] Date of Patent: Nov. 12, 1996

[54] VIDEO SCALING METHOD AND DEVICE

[75] Inventors: Christopher W. Malinowski; Stanley R. Zepp, Melbourne, both of Fla.

[73] Assignee: Harris Corporation, Melbourne, Fla.

[21] Appl. No.: 301,622

[22] Filed: Sep. 7, 1994

[51] Int. Cl.⁶ .............................. H04N 1/393; H04N 1/40
[52] U.S. Cl. ........................ 358/451; 358/448; 382/298; 364/715.07; 364/724.1
[58] Field of Search .................................. 358/451, 448, 358/445, 443, 456, 428, 525, 530, 534; 382/47, 298, 299, 260; 364/724.1, 724.16, 715.07, 723, 724.01

[56] References Cited

U.S. PATENT DOCUMENTS

| | | | |
|---|---|---|---|
| 4,328,426 | 5/1982 | D'Ortenzio | 358/447 |
| 4,991,022 | 2/1991 | Canfield et al. | 382/47 |
| 5,125,042 | 6/1992 | Kerr et al. | 382/47 |
| 5,289,292 | 2/1994 | Osada et al. | 358/451 |
| 5,335,295 | 8/1994 | Ferracini et al. | 382/47 |

*Primary Examiner*—Edward L. Coles, Sr.
*Assistant Examiner*—Thomas D. Lee
*Attorney, Agent, or Firm*—Rogers & Killeen

[57] ABSTRACT

A linear interpolator and decimating FIR filter with constant coefficients may be used in various configurations to scale a still or moving color video image horizontally (changing the number of pixels per row) or vertically (changing the number of pixels per column). For downscaling, the input pixel stream is initially upscaled with an interpolator by an upscaling factor of between one and two chosen so that the result can be subsequently downscaled with a decimation-by-power-of-two finite impulse response (FIR) filter to provide the desired final scaling. Upscaling is a special case accomplished by means of linear interpolation. Vertical and horizontal scaling may be performed with different, independent scaling factors.

19 Claims, 2 Drawing Sheets

5,574,572

VIDEO SCALING METHOD AND DEVICE

BACKGROUND OF THE INVENTION

The present invention relates to video image resizing architectures, and more particularly to a device and method for scaling a still or moving video image comprised of a first plurality of digital picture elements (known as pixels) in order to replicate the image with a second plurality of pixels.

A digital video image comprises an array of pixels, with the number of pixels in each horizontal row and vertical column being determined by the system in which the image is formed. When the image is to be displayed in a system that uses the same number of pixels in each row as the input image and the same number of pixels in each column as the input image, the image may be displayed directly. However, when the image is to be displayed in a system that uses a different number of pixels in each row and/or a different number of columns as the input image, the image must be scaled so that the same image can be displayed in the new array of pixels. For example, an image comprising a 500 by 750 array of pixels must be scaled up before it can be displayed in a system that uses an array of 750 by 900 pixels. Conversely, the same image may need to be scaled down before it can be displayed in a system using an array of only 250 by 350 pixels. As is apparent, the horizontal and vertical scaling factors may not be the same. Similar scaling steps may be required when a portion of an image on a display is to be enlarged to fill the entire display or when an image on a display is to be reduced and provided as a small inset in the display.

Digitized color video images are typically comprised of pixels that include data bits for luminance (Y) and for chrominance (U, V), and may have, for example, eight data bits for each of the Y, U, and V components (other color component systems, such as Red, Green, Blue (RGB), being equivalent.) When a color image is scaled for display in another system, each of the color components must be scaled.

Video images are desirably scaled in real-time (i.e at the rate they are delivered to the video processing system) when upscaling (increasing the number of pixels per image) or downscaling (decreasing the number of pixels per image.)

When an image is to be scaled, an input stream of pixels may be mapped to an output stream by interpolation. For example, when an image is to be scaled using linear interpolation, the input stream of pixels may be mapped into increments dx, where dx=1/K and K is a scaling factor. As illustrated in FIG. 1, with an upscaling K=3/2 (dx=2/3), an input stream of six pixels may be mapped into nine increments that will become nine output pixels. The value of each of the nine output pixels may be determined by interpolating between corresponding pixels in the input stream.

Various devices and methods for scaling video images are available. However, most do not afford real-time scaling and cannot selectively upscale and downscale with different scaling factors. Further, those devices and methods that may be able to upscale and downscale in real-time either rely on massive image pixel buffers and use complex calculations—with an associated complex array of components, or do not provide reasonable quality. For example, the scaled image may flicker, or may be incomplete because pixels, rows or columns have been skipped, or because aliasing has been encountered. Aliasing is distortion of an image caused by introduction of undesirable components into the processed signal during the scaling process and may be encountered when a signal's contents are subsampled to the point where the Nyquist sampling criterion is no longer met. Such problems typically have been handled with complex pre- or postfiltering techniques.

Accordingly, it is an object of the present invention to provide a novel device and method for scaling a video image that obviates the problems of the prior art.

It is another object of the present invention to provide a novel device and method for real-time upscaling or downscaling a video image in which interpolation and subsequent decimation are performed without skipping pixels, rows or lines to provide a high quality scaled image.

It is yet another object of the present invention to provide a novel device and method for real-time upscaling or downscaling a video image in which buffer size requirements are reduced and the number of buffers is minimized without limiting downscaling capability.

It is still another object of the present invention to provide a novel device and method for scaling a video image in which duplicate sets of interpolators and FIR filters are paired in series to provide independent vertical and horizontal scaling. to assure, and in which only two pixel or line buffers are required for downscaling.

It is a further object of the present invention to provide a novel device and method for scaling a video image in which upscaling is accomplished with a single pixel or line buffer component and linear interpolator, and downscaling is accomplished with a upscaling linear interpolator and decimating FIR filter where the number of filter taps (i.e. bandwidth) is related to the decimating factor.

It is yet a further object of the present invention to provide a novel device and method for scaling a video image in which only two line (for vertical scaling) or pixel (for horizontal scaling) buffers are required regardless of the downscaling factor.

It is still a further object of the present invention to provide a novel device and method for real-time upscaling and downscaling a video image in which the scaling factor is a combination of a predetermined upscaling factor applied in a linear interpolator and a predetermined downscaling power-of-two (i.e. binary) factor applied in a decimating finite impulse response (FIR) filter.

It is also another object of the present invention to provide a novel device and method for real-time scaling a video image in which the image is first upscaled by a scaling factor selected so that the image can be subsequently downscaled by a decimating-by-power-of-two filter to provide the desired scaled image.

It is also a further object of the present invention to provide a novel device and method for scaling a video image with full filtering to provide a bandwidth that is narrow enough to avoid aliasing.

These and many other objects and advantages of the present invention will be readily apparent to one skilled in the art to which the invention pertains from a perusal of the claims, the appended drawings, and the following detailed description of preferred embodiments.

DESCRIPTION OF PREFERRED EMBODIMENTS

A device and method for scaling a moving or still video image may include an interpolator for upscaling and a decimating filter for downscaling. The upscaling interpolator may use an upscaling factor chosen so that the desire scaling of the image may be achieved by subsequent decimation in a decimation-by-power-of-two finite impulse response (FIR) filter. These two components may be used in several image scaling arrangements, including color image scaling, that will be discussed in detail following separate descriptions of the interpolator and filter. For example, the two components may be used as a set, and two sets may be paired to provide vertical and horizontal scaling in which the vertical and horizontal scaling factors need not be the same.

Figure 1:
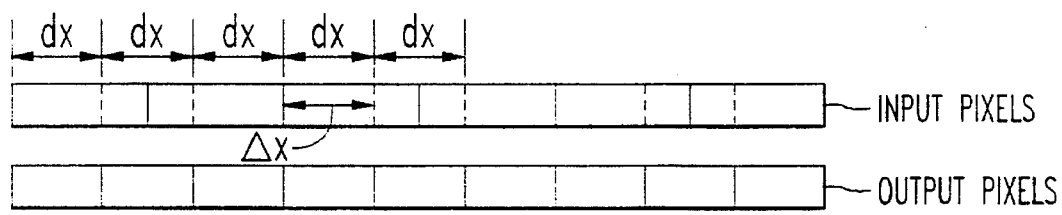
FIG. 1 is an illustration of mapping an output image size onto an input stream of pixels that may be used in linear interpolation.
Figure 2:
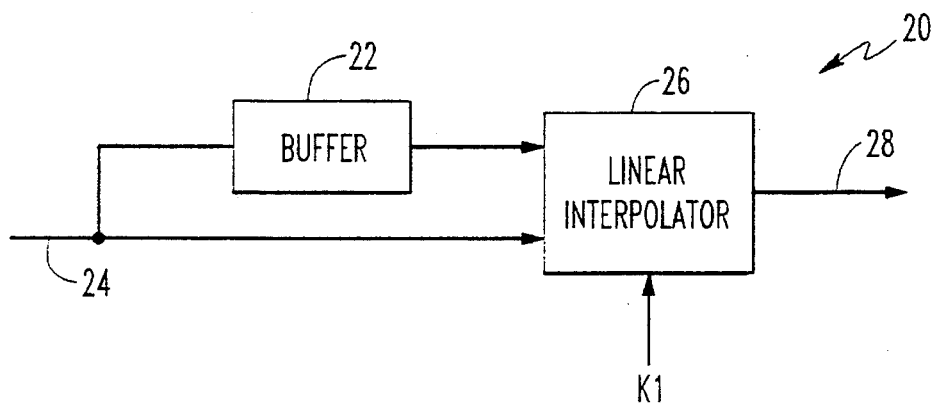
FIG. 2 is a block diagram of an embodiment of an interpolator of the present invention.

Interpolator. With reference now to FIG. 2, an upscaling interpolator 20 may include a buffer 22 for storing pixels from an input stream of pixels 24, and a linear interpolator 26 that sequentially receives each of the stored input pixels from the buffer 22 and the pixel subsequent thereto from the input stream 24 for providing an output of interpolated pixels 28 responsive to a predetermined upscaling factor K. The upscaling interpolator 20 provides an output stream with more pixels per image than the input stream, such as illustrated in FIG. 1. That is, an input stream of six pixels will become an output stream of nine pixels (with K=3/2). The same structure may be used for horizontal scaling, in which event the buffer is a pixel buffer, or for vertical scaling in which event the buffer is a line buffer with its length equal to the number of pixels per line.

Each input pixel is first stored in the buffer 22 and then provided to the linear interpolator 26 so that it may be evaluated with the next pixel. In the linear interpolator 26 the size of the pixels in the output stream is mapped onto the input stream of pixels by stepping across the input stream in increments dx (such as illustrated in FIG. 1). Since this is an upscaling interpolator, the increment dx is less than one (i.e., K>1). The stepping operation may be accomplished in an accumulator that adds the number of increments dx across the image (Σdx). The fractional part of Σdx, designated Δx and shown in FIG. 1, is the fractional distance between two input pixels that will be used to find the interpolated value for an output pixel therebetween. Mathematically, $$\Delta x = \Sigma dx \text{ Modulo } 1 \tag{1}$$

Figure 3:
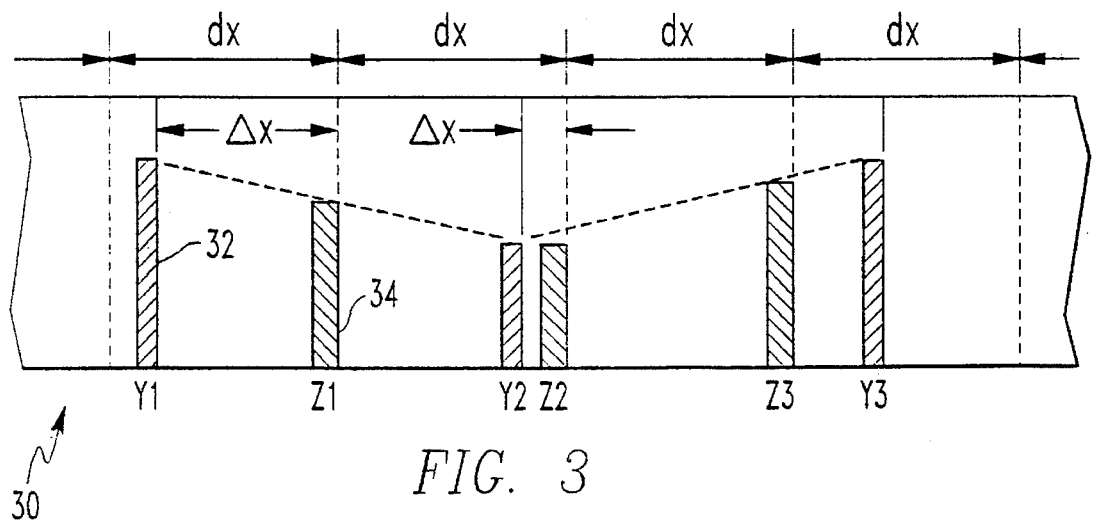
FIG. 3 is an illustration of operation of the linear interpolator of FIG. 2.

The next step is to use Δx and the values of the neighboring pixels to calculate the interpolated value for the output pixel. This calculation may be understood with reference to FIG. 3 that is an expanded view of a portion of a stream 30 of input pixels Y1, Y2, Y3, etc. in which input pixel values are indicated by vertical bars 32. The interpolated values of the output pixels may be determined using:

$$Z1 = Y1 + (Y2 - Y1)\Delta x \tag{2}$$

where, Z1 is the interpolated value of the output pixel between input pixels Y1 and Y2, and is illustrated in FIG. 3 by the vertical bar 34.

With reference again to FIG. 2, this calculation may be performed in the linear interpolator 26 that receives the value of Y1 from buffer 22 and the value of the subsequent pixel Y2 from the input stream 24. The value of Z1 is sent in the output stream 28.

As may be seen in FIG. 3, there may be situations where more than one interpolation calculation is required for a pair of input pixels. For example, two output pixels Z2 and Z3 fall between input pixels Y2 and Y3. The value of Z2 may be calculated as discussed above, and the value of Z3 may be calculated by substituting the value (Δx+dx) for the value Δx. In general, for a given set of input pixels, interpolations are generated so long as the accumulation of dx does not increment beyond the next integer pixel value. For an upscaling factor of K, the average number of interpolations per input pixel is K, and the maximum number of interpolations is the integer part of K+1, while the minimum number of interpolations is the integer part of K.

The precision required for the fractional part of dx (that is, the number of bits needed to represent dx) is governed by the interpixel precision needed and the number of times dx is stepped across the image. For example, if it is known that the number of pixels will be no greater than 768 pixels per line, then the worst case output pixel phase jitter is two nanoseconds at 13.5 Mhz (corresponding to 1/37.037 of one interpixel time span), and six bits of interpixel precision will be required. Further, as dx will be summed over 768 pixels, ten bits of additional precision will be needed for the sum. Therefore, dx must have a fractional precision of sixteen bits. In this example, the precision requirement for Δx is six bits and Δx may be calculated by rounding the output of the dx accumulator to six bits.

Figure 4:
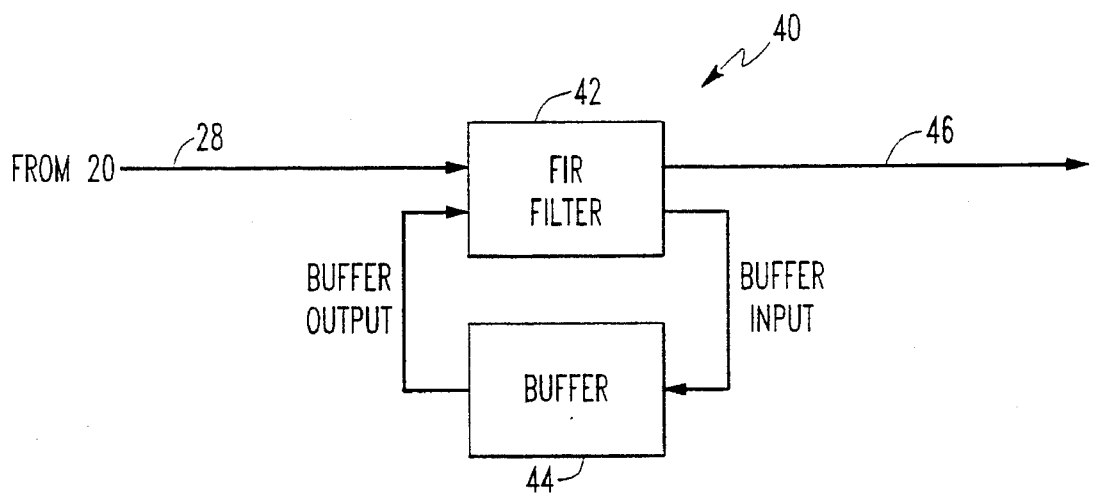
FIG. 4 is a block diagram of an embodiment of a decimating filter of the present invention.

Decimating Filter. With reference now to FIG. 4, a decimating filter 40 may receive the output stream 28 of interpolated pixels from the interpolator 20. Filter 40 includes a decimating finite impulse response (FIR) filter 42 and a buffer 44. The output 46 from the decimating filter 40 is a stream of correctly scaled pixels that form an array of pixels that represents the input image. When the filter 40 is being used a vertical filter the buffer 44 may include two line buffers, and when the filter 40 is being used as a horizontal filter the buffer 44 may include a minimum number of pixel buffers, desirably two.

The FIR filter 42 decimates the number of input pixels by a decimating factor equal to a predetermined power of two.

The filter may operate by accumulating filter calculations in buffer 44 for a number of the filter taps and then calculating the remainder of the filter and dumping the buffer at the decimated rate. For a decimating factor of D, a FIR filter with D+1 taps may be used. For example, a three tap filter will decimate by 2, a five tap filter will decimate by 4, a nine tap filter will decimate by 8, etc. Each of these D+1 tap filters has only one set of constant coefficients which are predetermined and set to achieve the desired bandwidth for that filter. For example, a five tap filter that decimates by 4 would have one set of coefficients designed to limit the bandwidth to ⅛ the input sampling frequency. The filters are desirably symmetric. That is, the five coefficients for a five tap filter would be C0, C1, C2, C1, C0.

The operation of the decimating filter 40 may be more clearly seen by reference to three examples, a two-to-one decimation, a four-to-one decimation, and an eight-to-one decimation. In two-to-one decimation, the FIR filter 42 has three taps which are generated and output for every other interpolated input. Note that the interpolated input may include two output pixels between some pairs of input pixels (for example output pixels Z2 and Z3 in FIG. 3) and these two output pixels of the interpolator will be referred to as Za and Zb. The sequence of operation of the filter 42 is shown below in the various states of its operation. The filter is symmetric and includes coefficients C0, C1, and C0.

State 0 Start-up operation; no interpolation. (Input from interpolator 26)

State 1 $Za \cdot C0 + Zb \cdot C1$=buffer input

State 2 $Za \cdot C0$+buffer output=output 46 $Za \cdot C0 + Zb \cdot C1$=buffer input State 3 $Za \cdot C0$+buffer output=output 46 $Za \cdot C0$=buffer input State 4 $Za \cdot C1 + Zb \cdot C0$=output 46 $Zb \cdot C0$=buffer input Note that two multiplications are required for the filter calculations and two for the interpolation for a total of four multiplications per input pixel. The coefficients may be set to provide a bandwidth of ½ the input sampling rate.

In four-to-one decimation, a five tap filter is implemented before output pixels are dumped every fourth clock. Coefficients may be set to provide a bandwidth of ⅛ the input sampling rate. In this example the interpolation pattern repeats every three inputs and the output pattern repeats every four interpolations.

State 0 Start-up operation; no interpolation (Input from interpolator 26)

State 1 $Za \cdot C0 + Zb \cdot C1$=buffer input

State 2 $Za \cdot C2 + Zb \cdot C1$+buffer output=buffer input

State 3 $Za \cdot C0$+buffer output=output 46 $Za \cdot C0$=buffer input

State 4 $Za \cdot C1 + Zb \cdot C2$+buffer output=buffer input

State 5 $Za \cdot C1 + Zb \cdot C0$+buffer output=output 46 $Zb \cdot C0$=buffer input In eight-to-one decimation, a nine tap filter is implemented before output pixels are dumped every eight output samples. Coefficients may be set to provide a bandwidth of 1/16 the input sampling rate. As in the above, a maximum of four multiplications are required per input pixel.

State 0 Start-up operation; no interpolation (Input from interpolator 26)

State 1 $Za \cdot C0 + Zb \cdot C1$=buffer input

State 2 $Za \cdot C2 + Zb \cdot C3$+buffer output=buffer input

State 3 $Za \cdot C4$+buffer output=buffer input

State 4 $Za \cdot C3 + Zb \cdot C2$+buffer output=buffer input

State 5 $Za \cdot C1 + Zb \cdot C0$+buffer output=output 46 $Zb \cdot C0$=buffer input Operation and Arrangement of Components. The interpolator and filter may be used in various configurations depending on the scaling to be performed. The components may be used to scale horizontally (changing the number of pixels per row) and to scale vertically (changing the number of pixels per column). These operations may be performed independently without regard to which scaling is performed first and with different horizontal and vertical scaling factors, $K_h$ and $K_v$. It may be desirable to perform the vertical upscaling first so that the buffers used for vertical upscaling do not have to store the upscaled number of pixels in the horizontal rows and may be at minimum length.

For downscaling, the input pixel stream is initially upscaled by an upscaling factor of between one and two chosen so that the result can be subsequently downscaled by a power of two to provide the desired final scaling. For example, if a final scaling of ⅝ is desired, the input pixels may be initially upscaled by a factor of 5/4 in the interpolator 20 and thereafter decimated by a factor of 2 (downscaled by ½) in the decimating filter 40. Upscaling is a special case in which there is no decimation and in which the upscaling factor is not limited. In this manner, any final scaling factor may be achieved with a simple linear interpolator and power-of-two FIR filter with constant coefficients.

Figure 5:
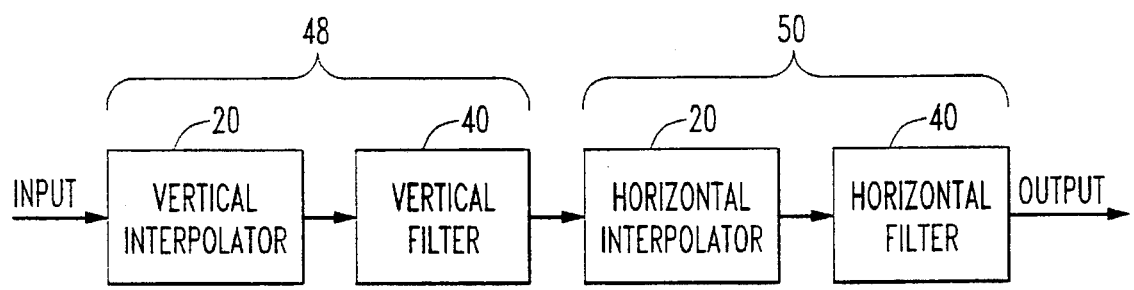
FIG. 5 is a block diagram of an embodiment of a scaling device of the present invention.

With reference now to FIG. 5, a scaling device may include interpolators 20 and filters 40 arranged as illustrated. An input stream of pixels may be scaled vertically using a first set 48 of interpolator 20 and filter 40, and thereafter scaled horizontally using a second set 50 of interpolator 20 and filter 40 that may be same as the first set 48. The only difference between the vertical and horizontal scaling is that the vertical scaling uses row delays and stores rows of pixels, while the horizontal scaling uses pixel delays and stores a pixel at a time. The sequence of the sets 48 and 50 for horizontal and vertical scaling may be reversed.

The order of the FIR filters (the number of taps) can be changed by changing the number of line or pixel buffers and multipliers. For example, if three, rather than two, line or pixel buffers drive the filter, an N:1 filter would have N+3 taps for scaling factors of from (½ through 1)/N, where N is a power of 2. Two additional multiplications would be required per input pixel.

Figure 6:
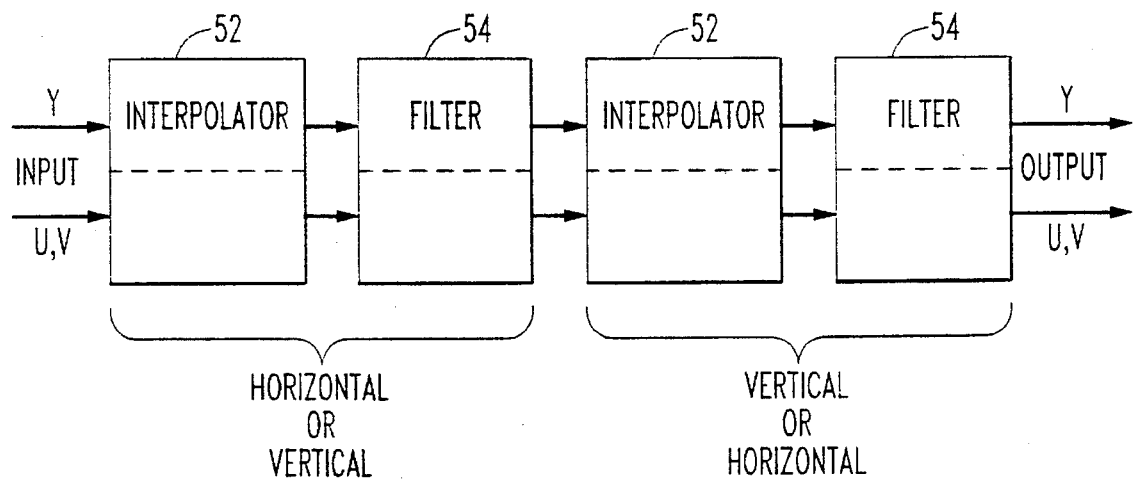
FIG. 6 is a block diagram of an embodiment of a color video scaling device of the present invention.

Color Video. Color video images may be scaled using the interpolator and filter discussed above. With reference to FIG. 6, color video input may be separated into Y and UV components and provided to staged interpolators 52 and filters 54, with the order of vertical and horizontal scaling being dependent on application. The interpolators 52 and filters 54 may each include two sections, each section comprising the interpolator 20 and filter 40 discussed above. The Y and UV components may share a common scaling factor at each stage (the vertical and horizontal scaling factors may be independent.) Alternatively, three separate and parallel scaling operations (one each for the Y, U, and V bits in the pixels) may be used.

The luminance (Y) information in each pixel is desirably scaled as indicated above using all input pixels. Preferably, the U and V information is subsampled in alternating pixels to reduce scaling hardware. By sampling the U and V in a two-to-one ratio, the scaling hardware may be shared so that two parallel scaling operations (e.g., the device illustrated in FIG. 6) may be used (one for Y and one alternating between U and V) instead of three.

The U and V components may be sampled in various formats. For example, a 4:2:2 format horizontally subsamples U and V two-to-one relative to Y, but does not subsample vertically. A 4:2:0 format subsamples vertically as well.

For example, the 4:2:2 sampling format (spatial arrangement of two rows of sampled pixels is shown, the pattern repeats) is:

| Row 1 | Y | Y | Y | Y | Y | Y | Y | (luminance) |
|---|---|---|---|---|---|---|---|---|
|  | O |  | O |  | O |  | O | (chrominance, U or V) |
| Row 2 | Y | Y | Y | Y | Y | Y | Y |  |
|  | O |  | O |  | O |  | O |  |

That is, the data are clocked in as

YUV y YUV y YUV y YUV and Y,U, and V information is subsampled from every other pixel (shown in capital letters), and the U and V information from the other pixels (shown with a small y) is not subsampled.

The 4:2:0 sampling format (spatial arrangement of four rows of pixels is shown, the pattern repeats) is:

| Row 1 | Y |   | Y | Y |   | Y | Y |   | Y |
|---|---|---|---|---|---|---|---|---|---|
|  |  | O |  |  | O |  |  | O |  |
| Row 2 | Y |   | Y | Y |   | Y | Y |   | Y |
| Row 3 | Y |   | Y | Y |   | Y | Y |   | Y |
|  |  | O |  |  | O |  |  | O |  |
| Row 4 | Y |   | Y | Y |   | Y | Y |   | Y |

That is, in the 4:2:0 format U and V information is subsampled 2:1 vertically and horizontally, and there is a one-half pixel offset of U and V information relative to Y information in both directions.

In the 4:2:2 format, an input stream of pixels may be clocked at a fixed clock rate generated by the video source. The input format may be binary words, for example eight bits long, on each clock, with one word being the Y scaler input and the other alternating between U and V. The Y input may be an unsigned eight bit binary number while the U and V may be unsigned or signed two's complement eight bit binary number. The $\Delta x$ used in the U and V calculations, denoted $\Delta uv$, may be the same for both U and V because the spatial relationship between Y and U or V is fixed. This means that $\Delta uv$ may be the same as $\Delta y$ or determined by dividing by two, where $\Delta y$ is the $\Delta x$ for Y.

The process of positioning the U and V outputs relative to the Y outputs may be accomplished in the scaler hardware by a combination of adding a phase offset to the U, V interpolation position relative to the Y position, and (or alternatively) adjusting the phasing the U,V decimating filter relative to the Y filter at the beginning of the row or array. This adjustment may include providing an unfiltered interpolation of the first U,V row or pixel followed by starting the U,V filter at the time that results in subsequent U,V filter outputs being properly positioned.

For example, and with reference to Table 1 below that depicts alternative spatial arrangements of the pixels (phase adjustment being performed in one dimension at a time using the interpolator and/or filter), consider horizontal rescaling a 4:2:2 input to a 4:2:2 output with four-to-one decimation. As may be seen in the middle sectin of Table 1, proper output positioning occurs when $\Sigma duv=\frac{1}{2}\Sigma dy$, and the second U,V interpolation is output directly (a point output with no filtering) followed by starting the U,V filter on the seventh Y interpolation (n=6, where n is the number of consecutive input pixel Y interpolations as counted (beginning from 0) from the beginning of the pixel row.) This corresponds to the fourth U,V interpolation. Table 1 also includes examples of two-to-one deci-mation for 4:2:2 and 4:2:0 output formats, and illustrates how this method of scaling can facilitate video format conversions. Similar examples of vertical rescaling are shown in Table 2.

Table 3 summarizes scaling options available in a device incorporating the present invention that is used as a NTSC/PAL decoder/scaler (4:2:2 input) in which downscaling includes 2:1, 4:1 and 8:1 decimations and upscaling is 1:1.2 (vertical only, horizontal upscaling is not needed in this particular application.)

While preferred embodiments of the present invention have been described, it is to be understood that the embodiments described are illustrative only and the scope of the invention is to be defined solely by the appended claims when accorded a full range of equivalence, many variations and modifications naturally occurring to those skilled in the art from a perusal hereof.

TABLE 1

U/V VS Y PIXEL SITING, HORIZONTAL

4:2:2 > 4:2:2 HORIZONTAL DOWNSCALE, 2:1

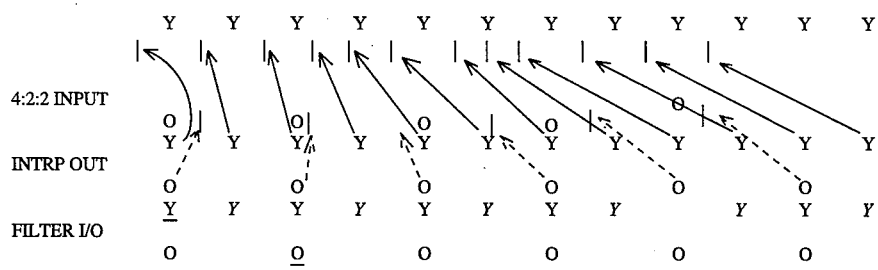

4:2:2 > 4:2:2 HORIZONTAL DOWNSCALE, 4:1

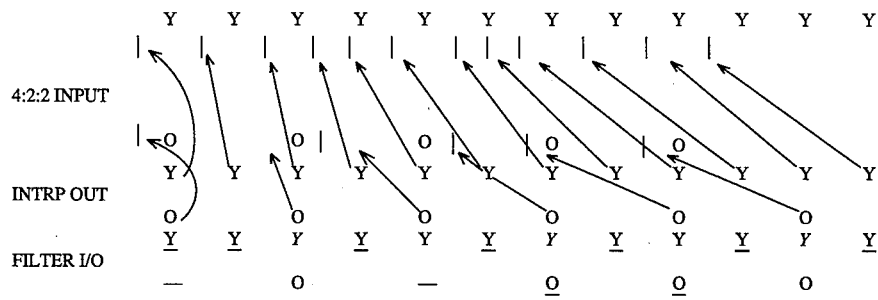

4:2:2 > 4:2:0 HORIZONTAL DOWNSCALE, 2:1

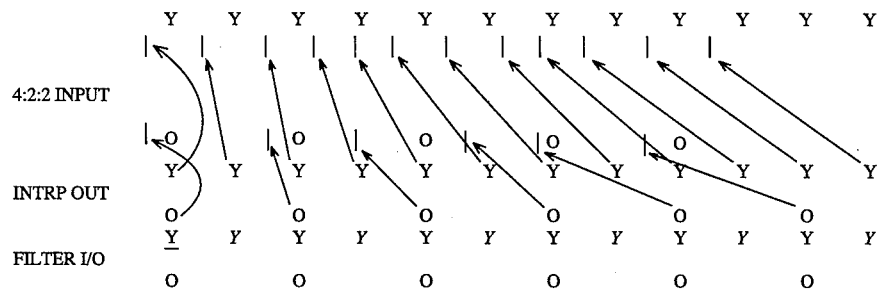

LEGEND:
Y    Y PIXEL INPUT/OUTPUT
O    U OR V PIXEL INPUT/OUTPUT
I    MAPPED INTERPOLATION POINT (OUTPUT TO INPUT)
FOR THE FILTER I/O:
BOLD (NOT UNDERLINED): DECIMATED FILTER OUTPUT OR UNFILTERED INTERPOLATION TO OUTPUT
BOLD (UNDERLINED): UNFILTERED INTERPOLATION TO OUTPUT AND ALSO FILST FILTER INPUT
UNDERLINED: FILTER INPUT NOT CORRESPONDING TO AN OUTPUT OR THE FILTER OUTPUT SITING.
ITALIC: FILTER INPUT AND ALSO THE TIME CORRESPONDING TO THE FILTER OUTPUT SITING.
—: UNUSED INTERPOLATION OUTPUT

TABLE 2

U/V VS Y PIXEL SITING, VERTICAL

| 4:2:2 > 4:2:2 2:1 DECIMATE | | | 4:2:2 > 4:2:0 2:1 DECIMATE | | | 4:2:2 > 4:2:0 4/3 UPSCALE | | |
|---|---|---|---|---|---|---|---|---|
| INPUT | INTRP OUT | FILTER I/O | INPUT | INTRP OUT | FILTER I/O | INPUT | INTRP OUT | FILTER I/O |

LEGEND:
Y Y PIXEL INPUT/OUTPUT
O U OR V PIXEL INPUT/OUTPUT
I MAPPED INTERPOLATION POINT (OUTPUT TO INPUT)
FOR FILTER I/O:
BOLD: DECIMATED FILTER OUTPUT OR UNFILTERED INTERPOLATION TO OUTPUT
UNDERLINED: FILTER INPUT NOT CORRESPONDING TO AN OUTPUT OR THE FILTER OUTPUT SITTING
ITALICS: FILTER INPUT AND ALSO THE LINE CORRESPONDING TO THE FILTER OUTPUT SITTING

TABLE 3

NTSC/PAL DECODER/SCALER
U/V VS Y SCALER OUTPUT FUNCTIONS
(4:2:2 INPUT VIDEO ASSUMED)

| OPERATION | $\Sigma\, d_{uv}$ | POINT OUTPUT | START U,V FILTER | U,V DECIMATE |
|---|---|---|---|---|
| 4:2:2 > 4:2:2 HORIZONTAL DOWNSCALE | | | | |
| 2:1 | $\frac{1}{2}(\Sigma\, d_y) + \frac{1}{2}(d_y)$ n even | n = 0 | n = 2 | 2:1 |
| 4:1 | $\frac{1}{2}\,\Sigma\, d_y$, n even | n = 2 | n = 6 | 4:1 |
| 8:1 | $\frac{1}{2}\, d_y$, n even | n = 4 | n = 12 | 8:1 |
| VERTICAL | | | | |
| UPSCALE | $\Sigma\, d_y$ | ALL | NONE | NONE |
| DOWNSCALE | $\Sigma\, d_y$ | NONE | n = 0 | EQUALS Y |
| 4:2:2 > 4:2:0 HORIZONTAL DOWNSCALE | $\frac{1}{2}\,\Sigma\, d_y$, n even | NONE | n = 0 | EQUALS Y |

TABLE 3-continued

NTSC/PAL DECODER/SCALER
U/V VS Y SCALER OUTPUT FUNCTIONS
(4:2:2 INPUT VIDEO ASSUMED)

| OPERATION | $\Sigma\ d_{uv}$ | POINT OUTPUT | START U,V FILTER | U,V DECIMATE |
|---|---|---|---|---|
| VERTICAL | | | | |
| UPSCALE | $(\Sigma\ d_y) + \frac{1}{2}(d_y)$ n even | n = 0 | n = 1 | 2:1 |
| 2:1 | $\Sigma\ d_y$ | NONE | n = 0 | 4:1 |
| 4:1 | $\Sigma\ d_y$ | NONE | n = 0 | 8:1 |
| 8:1 | $\Sigma\ d_y$ | NONE | n = 0 | 16:1 |

What is claimed is:

1. A device for scaling an input of a first plurality of pixels arrayed in horizontal rows and vertical columns that form an image in order to provide an output of a second plurality of pixels that forms the image, each of the pixels having N components, the device comprising as a set:

an upscaling interpolator comprising (a) a buffer for storing the input pixels, and (b) a linear interpolator that sequentially receives each of the stored input pixels from said buffer and the pixel subsequent thereto for providing interpolated output pixels therefrom responsive to a predetermined upscaling factor; and a decimating finite impulse response (FIR) filter for reducing the number of output pixels from said upscaling interpolator responsive to a predetermined downscaling factor, said decimating FIR filter comprising no more than two row buffers for each of the pixel components, said second plurality being equal to said first plurality times said upscaling and downscaling factors, wherein repetitive operation of said set of said upscaling interpolator and said decimating FIR filter will provide an output of the second plurality of pixels that forms the image.

2. The device of claim 1 wherein said set of said set of said upscaling interpolator and said decimating FIR filter is for horizontal scaling, and further comprising a second said set of said upscaling interpolator and said decimating FIR filter for vertical scaling, said two sets being arranged in series so that the output of one said set is the output of the other said set.

3. The device of claim 2 wherein said second set provides its output to the other said set.

4. The device of claim 2 wherein the predetermined upscaling and downscaling factors of said upscaling interpolator and said decimating FIR filter of said set are independent from the predetermined upscaling and downscaling factors of said upscaling interpolator and said decimating FIR filter of said second set.

5. The device of claim 1 wherein said components comprise luminance data and chrominance data, and wherein said device comprises one said set of said upscaling interpolator and said decimating FIR filter for scaling said chrominance data, and a second said set of said upscaling interpolator and said decimating FIR filter for scaling said luminance data.

6. The device of claim 1 wherein said components comprise N color data components, and wherein said device comprises N ones of said set of said upscaling interpolators and said decimating FIR filters.

7. The device of claim 1 wherein said decimating FIR filter decimates in powers of two.

8. The device of claim 1 wherein said upscaling factor is at least one and no greater than two.

9. A device for scaling an input of a first plurality of pixels that form an image in order to provide an output of a second plurality of pixels that forms the image, the device comprising two sets of:

an interpolator for increasing the number of input pixels to a third plurality of interpolated pixels; and a decimating-by-power-of-two FIR filter with only two row buffers for reducing the number of interpolated pixels to said second plurality of output pixels.

10. The device of claim 9 wherein each said interpolator is responsive to a scaling factor of at least one and no greater than two, said scaling factor for each said interpolator being independent of said scaling factor for the other said interpolator.

11. The device of claim 9 wherein one said interpolator comprises one row buffer and one said FIR filter comprises N taps, with N being one greater than the power of two decimation of said one FIR filter.

12. The device of claim 9 wherein one said interpolator comprises one row or pixel buffer and one said FIR filter comprises N taps, with N being three greater than the power of two decimation of said one FIR filter.

13. A device for scaling an input of a first plurality of pixels arrayed in horizontal rows and vertical columns that form an image in order to provide an output of a second plurality of pixels that forms the image, each of the pixels having N components, the device comprising:

first means for vertically scaling pixels responsive to a vertical scaling factor; and second means connected in series with said first means for horizontally scaling pixels responsive to a horizontal scaling factor, said horizontal scaling factor being independent from said vertical scaling factor, each of first and second means comprising an upscaling interpolator and a decimating-by-power-of-two FIR filter with no more than two row buffers per component.

14. The device of claim 13 wherein said first means provides an output to said second means.

15. A device for scaling an input of a first plurality of pixels arrayed in horizontal rows and vertical columns that form an image in order to provide an output of a second plurality of pixels that forms the image, each of the pixels having N color components, the device comprising:

first means for vertically scaling pixels; and second means for horizontally scaling pixels connected in series with said first means, each of said first and second means comprising plural sets of an upscaling interpolator and a decimating FIR filter with no more than two row buffers per color component connected in series therewith, each of said sets for scaling at least one of said N color components.

16. The device of claim 15 wherein at least one of said sets is for scaling two of said N color components, and for subsampling said two color components at a rate related to a decimating power of said FIR filter.

17. The device of claim 15 wherein said N color components are Y, U, and V components, and one of said sets is for scaling said U and V components, and for subsampling said U and V components at a rate related to a decimating power of said FIR filter, and another of said sets is for scaling said Y components without subsampling.

18. A method of scaling an input of a first plurality of pixels that form an image to provide an output of a second plurality of pixels that forms the image, each of the pixels having N components, the method comprising the steps of:

(a) upscaling the input pixels in an interpolator responsive to an upscaling factor; and (b) decimating the upscaled pixels in decimation-by-power-of-two FIR filter using no more than two row buffers, the upscaling factor being selected so that the subsequent decimation by power of two provides the second plurality of pixels.

19. The method of claim 18 wherein steps (a)–(b) are for vertically scaling responsive to a vertical scaling factor, and further comprising the step of horizontally scaling the vertically scaled image responsive to a horizontal scaling factor by repeating steps (a)–(b).

* * * * *